INVENTOR.
JOHN W. MAUCHLY
BY
Busser, Smith & Harding
ATTORNEYS

May 10, 1966 J. W. MAUCHLY 3,250,902

NON-LINEAR NETWORK COMPUTER

Filed May 16, 1962 4 Sheets-Sheet 2

INVENTOR.
JOHN W. MAUCHLY
BY
[signature]
ATTORNEYS

May 10, 1966 J. W. MAUCHLY 3,250,902

NON-LINEAR NETWORK COMPUTER

Filed May 16, 1962 4 Sheets-Sheet 3

INVENTOR.
JOHN W. MAUCHLY
BY
ATTORNEYS

NON-LINEAR NETWORK COMPUTER

Filed May 16, 1962

4 Sheets-Sheet 4

INVENTOR.
JOHN W. MAUCHLY
BY
ATTORNEYS 3,250,902

NON-LINEAR NETWORK COMPUTER

John W. Mauchly, Ambler, Pa., assignor to Mauchly Associates Inc., Fort Washington, Pa., a corporation of Pennsylvania Filed May 16, 1962, Ser. No. 195,085
16 Claims. (Cl. 235—185)

This invention relates to non-linear network computers of analog type.

In particular, it relates to a computer adapted for the solution of scheduling and flow problems. In such cases the end result desired is implementation of a plan for action. General purpose digital computers have been used to solve this type of problem, and in cases highly complex problems, their use, involving complex programming, is warranted. High accuracy with avoidance of cumulative or otherwise non-tolerable errors may also dicatate their use.

But in may situations an analog computer, provided in accordance with the invention, may be used, giving sufficient accuracy of results and having the advantage of signalling quickly advantageous changes in strategy. Furthermore, such an analog computer is superior for human understanding and interpretation, and an operator may quickly make tentative changes in conditions and see immediately the consequences thereof. Further, despite limitations on its complexity from a practical standpoint, it may well solve quite complex problems which may, on preliminary analysis, be seen to be dissectible into the simpler sub-problems, individually within its capabilities, and which then may be considered as units capable of being associated for the overall problem which may then itself come within the capabilities of the analog.

The analog computer also serves as a valuable apparatus for training personnel for complex programming of digital computers, giving them a "feel" for the problems and the approaches to their solutions. It may even be used concurrently with a digital computer for better visualization of what the latter may be intended to do, and serving as a check on the sufficiency of the programming of the digital computer. Clearly, if the result given by the more readily understandable and interpretable analog computer does not approximate that given, impersonally, by the digital computer, there is a warning that one or the other is improperly set up, so that checking may be done and corrective steps taken.

The general object of the invention is the provision of a computer having the capabilities and advantages just described. The attainment of the general object and of more detailed objects will be best understood by considering, first, a typical type of problem which may be solved and, then, stepwise aspects of the analog starting with its simplest form and progressing to its more sophisticated forms and practical embodiment. For this purpose reference will be made to the accompanying drawings in which.

Figure 7:
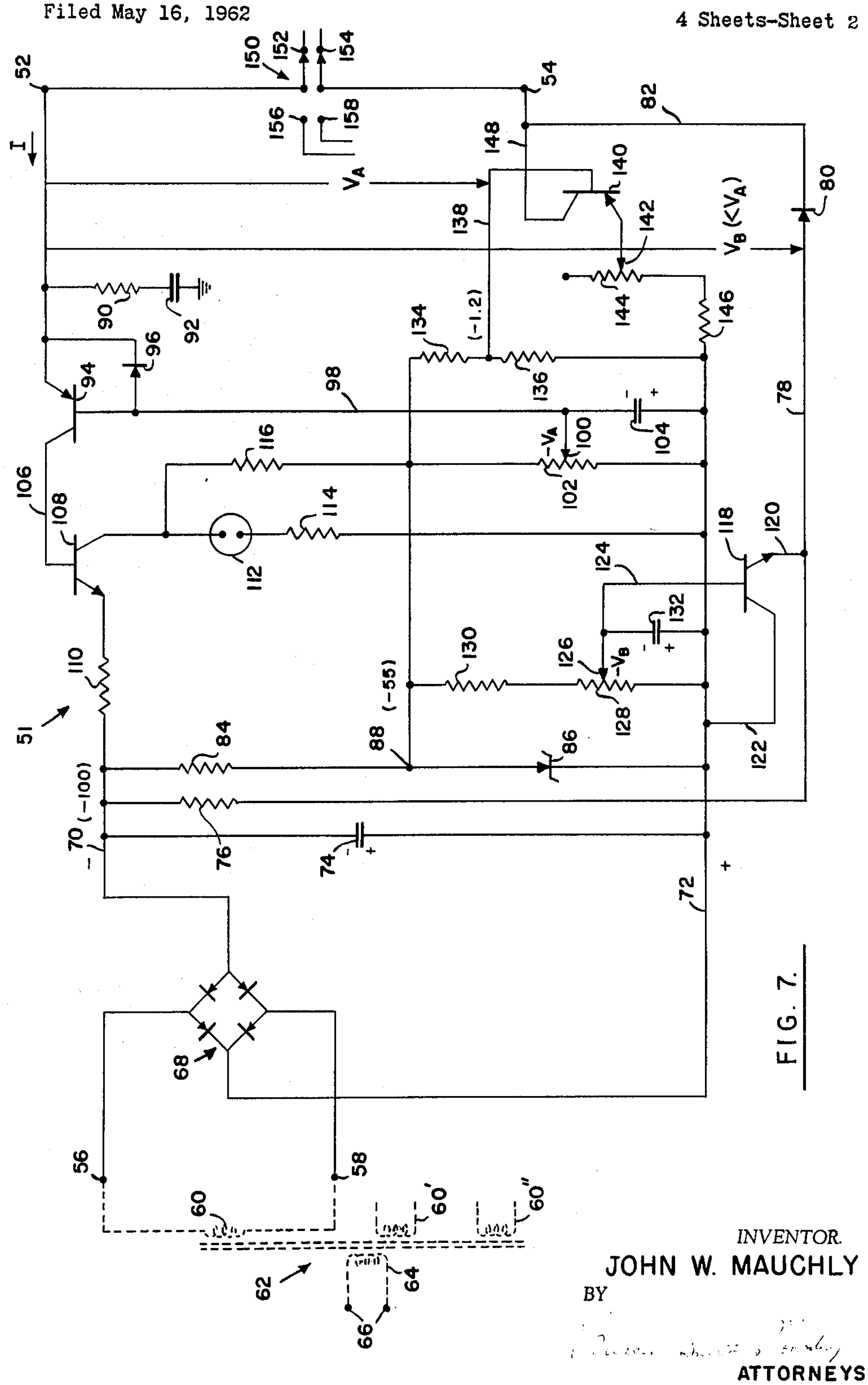
FIGURE 7 is a diagram of a preferred network element or module alternative to the type shown in FIGURE 6.
Figure 9:
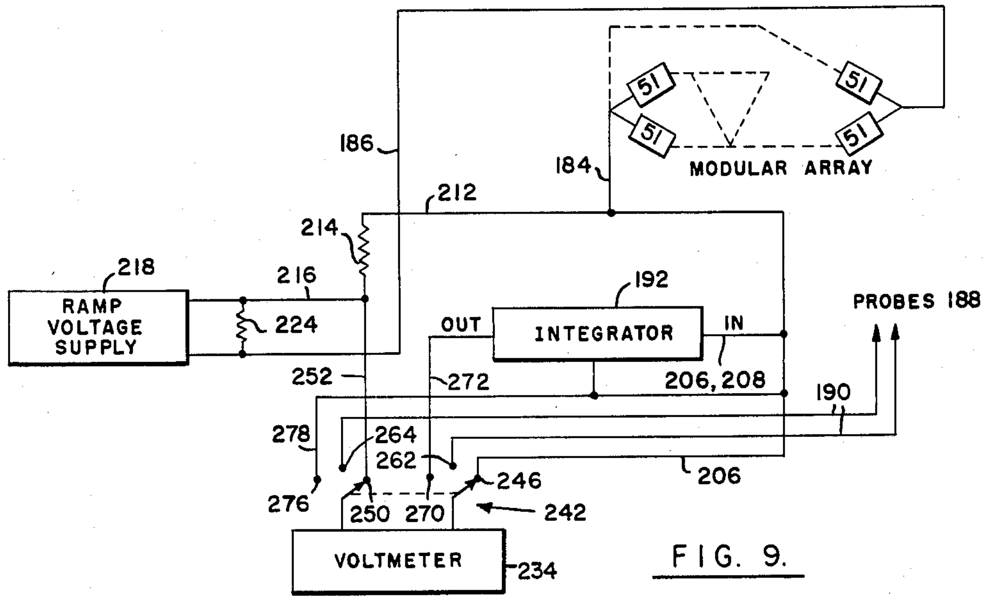
Figure 8A:
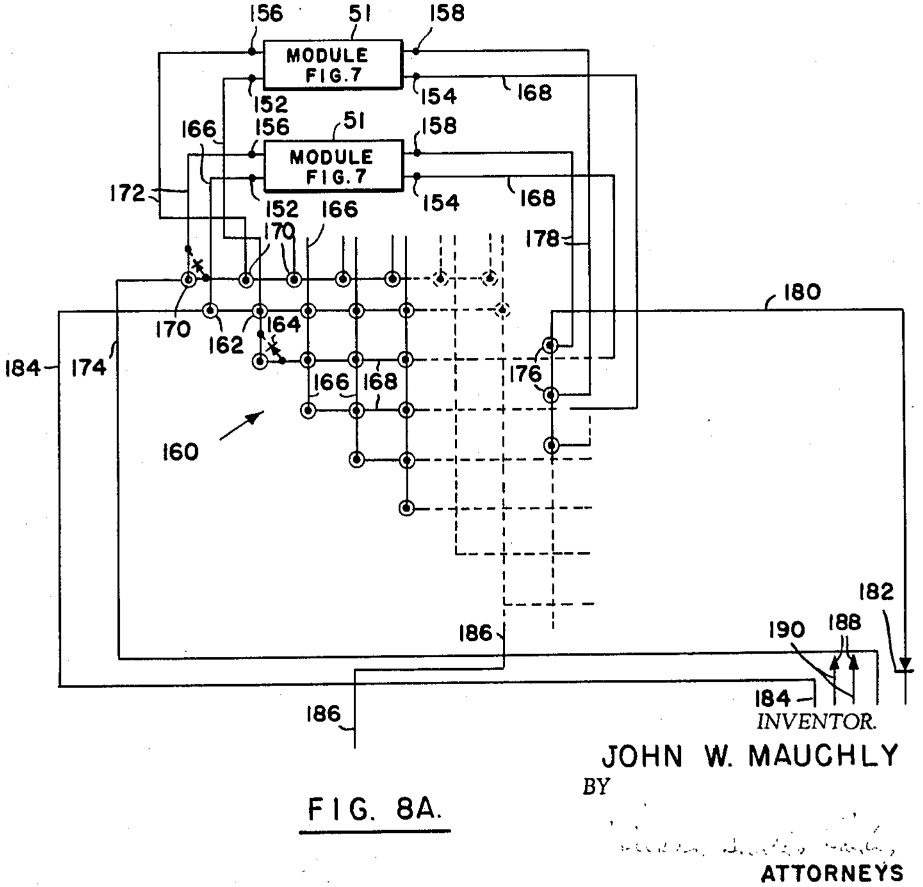
Figure 8B:
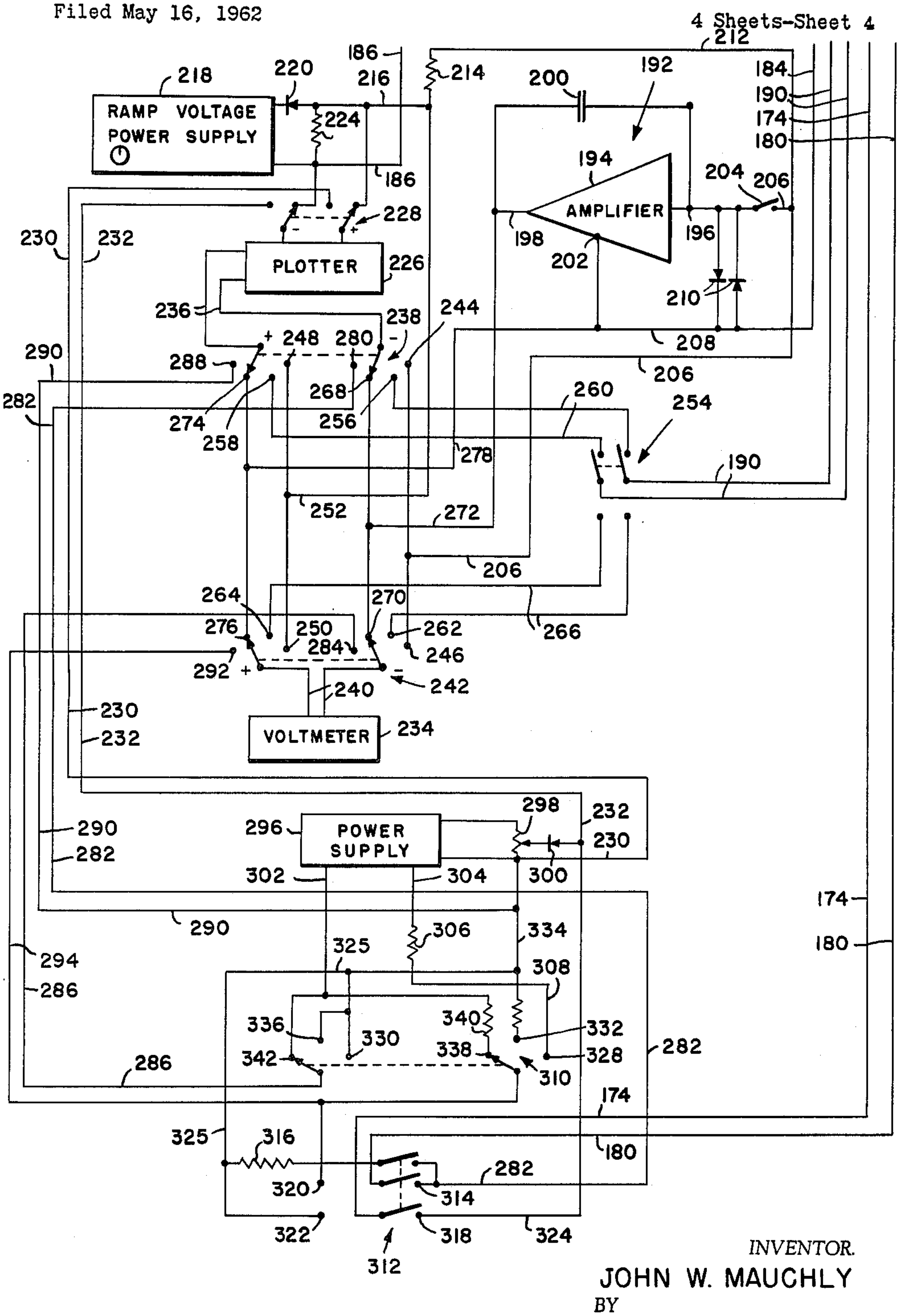

FIGURES 8A and 8B constitute diagram of a network incorporating modules of the type shown in FIGURE 7, involving the use of a plugboard for arbitrary selections of interconnections and arrangements for setting up and operating the apparatus; and FIGURE 9 is a diagram to facilitate explanation of the operation of the apparatus of FIGURES 8A and 8B.

Figure 1:
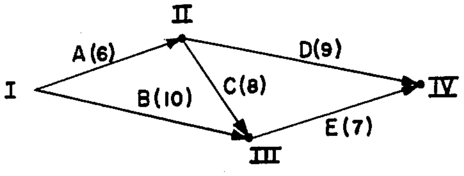
FIGURE 1 is a network diagram explanatory of a typical, but simple, problem.

Referring, first, to FIGURE 1, there is indicated therein a network diagram explanatory of certain scheduled work on a project, the diagram being given in a form which is conveniently used for visualization of a project. This diagram comprises a series of nodes or junctions designated I, II, III and IV, connected by lines A, B, C, D and E representative of jobs or branch activities. Arrowheads on these lines indicate the direction of progress of time. The numbers inserted in parentheses represent time units for the various jobs.

The nodes may be considered events, i.e. beginnings and completions of jobs, and the diagram may have the following significance:

Event I represents the beginning of the project. At this time there is started a job A which may be predicted to take for its completion, at II, six time units (which may be hours, days, weeks, or even greater units of time). Concurrently with the start of job A, there may be started a job B expected to require ten time units and terminating on or before the time of event III. The fact that the jobs A and B are not necessarily consecutive (neither depending on the other) is indicated by the fact that the end of one is not connected to the beginning of the other. D represents a job, expected to take nine time units, which cannot be started until job A is completed. Accordingly, it starts at Event II, at or after the completion of job A and terminates at or before Event IV, which event is considered to represent the termination of the complete project.

C represents another job, expected to take eight time units, which may also be started only at the completion II of job A. Event II represents the start of a job E which may only be started when both jobs B and C are completed. Job E is expected to take seven time units. The entire project will be completed, at Event IV, only when both jobs D and E are completed. In the case of this simple problem, it may be considered that the end desired is to arrive at the completion Event IV at the earliest time following the beginning of the project at I.

The diagram may now De analyzed as follows:

The path from I to IV by way of Event II involves fifteen time units.

The path from I to IV by way of Event III, and considering only jobs B and E would take seventeen time units. However, it will be evident that job E must be completed before the ultimate completion at IV and that its start depends upon the completion of job C which in turn cannot be started before completion of job A. Since the jobs A, C, and E must be sequential, it will be evident that the project will take a time equal to the sum of the times for these jobs, namely twenty-one time units, and the job may not be completed in less time (unless it is found possible to do something to accelerate one or more of these jobs). The path of progress A, C, E has become known as the "critical path" for the project, representing the sequence of jobs determinative of the minimum time for completion.

Certain other matters now become evident. Since Event III cannot be actually completed, in the sense of permitting the beginning of job E, in less than fourteen time units, it is evident that there is a leeway, or float time, for the job B of four time units since the job B itself requires only ten time units. Thus, if some circumstances make that desirable, the job B could be started as much as four time units after the beginning of job A. Or some circumstances may be evident which might make it desirable to interrupt the job B, breaking it into two job elements which, with a break of four time units (during which equipment or personnel might be used on another job), will total fourteen time units.

Similarly, job D requires only nine time units and has a float time of six time units since the jobs C and E require a minimum of fifteen time units.

For a more complete discussion of the foregoing matters reference may be made to "Critical-Path Planning and Scheduling: Mathematical Basis," by James E. Kelley, Jr., published in "Operations Research," vol. 9, No. 3, May-June, 1961.

Figure 2:
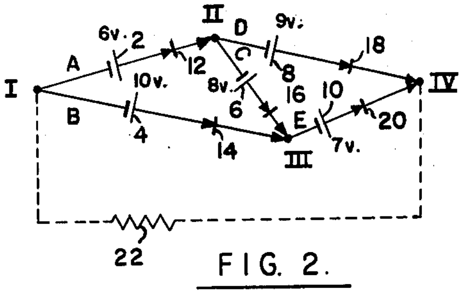
FIGURE 2 is a wiring diagram illustrating an analog for the solution of the problem presented in FIGURE 1.

An electrical analog of what has just been discussed is illustrated in FIGURE 2, in which nodes or terminals are correspondingly designated, as are also the circuit branches corresponding to the jobs in FIGURE 1. As will be seen, the various branches of the circuit contain voltage sources indicated as batteries 2, 4, 6, 8 and 10, all having their terminals oriented so as to produce current flow in the directions represented by the arrows in FIGURE 1, i.e., in the direction of time progress. These sources (batteries) are indicated as having electromotive forces corresponding, in volts, to the completion times associated with the corresponding branches in the network diagram, FIGURE 1. The respective branches are also provided with diodes as shown at 12, 14, 16, 18 and 20, all of the diodes being oriented, for forward current flow, in the direction of current flow produced by their associated batteries. The circuit is illustrated as completed by the resistance 22 connected betwen nodes (events) I and IV. In this simple analog an actual load resistor 22 would not be required, but it is illustrated to pave the way for considerations of actual current flow hereafter.

Assume that the diodes have forward resistances much less than their reverse resistances. This, of course, is true of conventional crystal diodes which may be used. Assume also that the sources have very low internal resistances and that the resistance 22, if not infinite, is high compared to other resistances except the reverse resistances of the diodes. The resulting electrical configuration then has the following aspects:

Due to the sum of the electromotive forces of the sources 2 and 6, it will be evident that the potential of node III is fourteen volts above that of node I. Accordingly, so far as branch B is concerned, no current can flow because the net potential across diode 14 is four volts in the reverse direction. Similarly, no current can flow in branch D because the potential of node IV is fifteen volts, due to sources 6 and 10, and exceeds the potential of nine volts of the source 8, the diode 18 thus being biased in its reverse direction and having across it a voltage drop of six volts. It will be evident that the potential of node IV is 21 volts higher than that of node I, and this corresponds to the minimum time of completion of the project over the critical path referred to previously. Only the branches in this critical path, namely, A, C and E carry current. The branches B and D do not carry current and are therefore not parts of the critical path. Measurement of the potential drops across the diodes 14 and 18, for example by a voltmeter having a very high input resistance (e.g. a vacuum tube voltmeter), will give directly the float times for the branches (jobs) B and D. It may be noted that the (substantially) zero potential drops across the diodes 12, 16 and 20 will indicate that these are in the branches forming the critical path, measurements of current flow being unnecessary.

From the foregoing it will be evident that FIGURE 2 is a complete electrical analog for the project represented by FIGURE 1 and the potential measurements referred to give quantitatively the significant time matters which are involved. While the problem, given for explanation, and the resulting analog are simple, it will now be evident that a far more complex problem may be represented by a similar analog provided by the similar insertions of potential sources and diodes in a circuit having branches corresponding to the diagram representative of such project. Visual analysis, which may be impractically complex for a diagram, is made unnecessary by the analog, potential measurements in which will directly lead to determination of the total time involved, ascertainment of the critical path, and float times.

It will, of course, be evident that as a practical matter battery sources cannot usually be conveniently chosen to represent completion times of jobs; but the analog of the type shown in FIGURE 2 is truly representative of the conditions existing, though these may be obtained otherwise in a more practical form of analog referred to hereafter. Before proceeding to consideration of a practical form, however, consideration will be given to matters of cost, since a completely useful analog will ordinarily be required to take these into account.

The foregoing discussion assumed that the jobs had invariable time units, and the solution achieved the minimizing of the time interval between the start and completion of the project. The minimizing of this time interval is generally desired, involving such factors as avoidance of more than essential interruptions of other activities (as where the project is for repair of overhauling of a portion of a manufacturing plant), getting the end result into profitable operation (the construction of an office building, hotel, toll road, or the like), the early release of equipment and personnel for other projects, avoidance of demurrage charges, minimizing standby of personnel, etc. The acceleration of completion of a project, as will be obvious from what has just been stated, generally has monetary value. The question then arises as to whether the jobs which have been found critical may be advantageously accelerated at increased cost for overtime, hastening of deliveries or the like. It may be noted that as a particular job is accelerated, the configuration involved might well shift so that some other job, previously not critical, would become so; for example, referring to FIGURE 1, it is evident that if job A could be reduced to four time units and job C to five time units, job B would then become part of the crtical path, and if other times were not reducible the entire project time would be reduced to seventeen time units. An analog for maximum utility should take into account these matters of reduction of time consumed at the expense of extra costs, so that evaluation might be made of the total extra cost with respect to the monetary advantages of early project completion.

What is required may be best understood by considering, first, a typical simple example.

Let it be assumed that there are two activities, designated Activity 1 and Activity 2 having the characteristics indicated in the following tabulation:

| | Activity 1 | Activity 2 |
|---|---|---|
| Normal time | 12 | 8 |
| Crash time | 6 | 4 |
| Cost increase per unit decrease of time | 2 | 1 |

Assume that these two activities are successive, Activity 2 beginning at the end of Activity 1.

Figure 3:
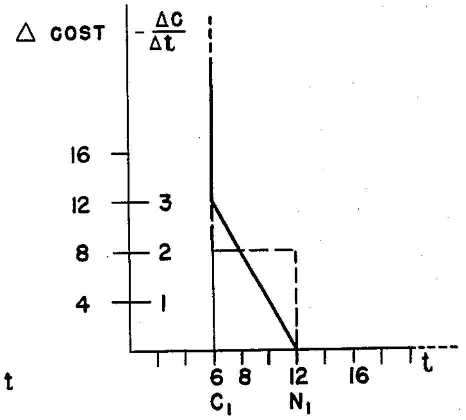
FIGURE 3 is a graph illustrative of cost considerations in a typical problem.

FIGURE 3 represents graphically the tabulation for Activity 1, change of cost (the change alone being of interest) being plotted against time. As indicated, the maximum normal time $N_1$ expected for the activity, and entailing no increase of cost is twelve time units. The minimum time $C_1$ for the activity, which cannot be decreased irrespective of extra costs, is six time units, which corresponds to a portion of the graph rising to infinite (ineffectually increased) cost at the minimum time. Between twelve time units and six time units the cost will increase (for example for overtime) and the rate of cost increase can usually be considered to involve a linear change of cost with time represented by the sloping line on the graph which has a slope of value 2, this being the cost increase per unit decrease of time. (The linear relationship is assumed only for purposes of initial simplicity; it will shortly become apparent that the variation of cost with time may be non-linear, i.e., some time saving may be achieved at little extra cost, but further time saving may involve considerable extra cost.)

Figure 4:
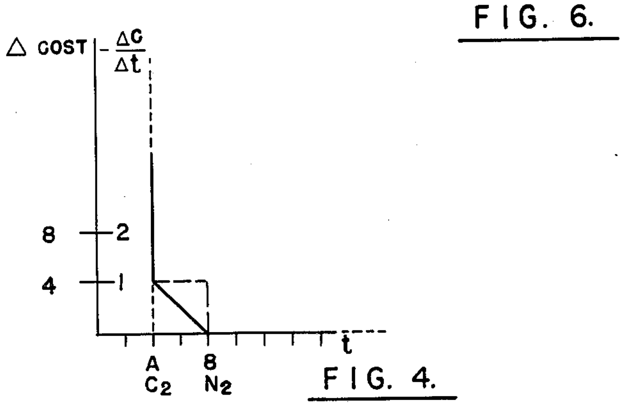

FIGURE 4 represents graphically in similar fashion the tabulated situation for Activity 2, the normal and crash times being $N_2$ and $C_2$.

Figure 5:
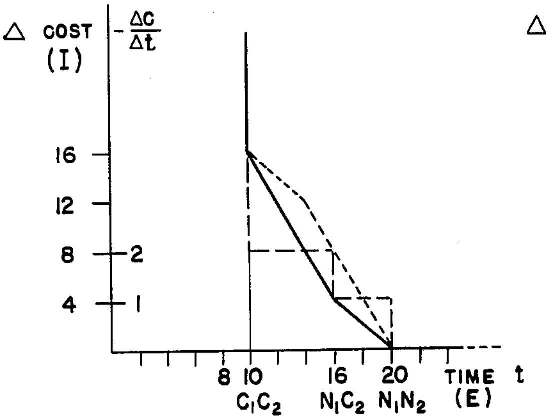
FIGURES 4 and 5 are further diagrams illustrative of the same problem and an approach to its solution.

FIGURE 5 represents graphically the combination of the serially related activities, the conditions involved being indicated by the combinations of letters. Considering the full line graph, the sum of the normal times for the two activities is twenty units, with no increase of basic cost. If Activity 2 had its time reduced to the crash time, a reduction of four time units, the overall time would be reduced to sixteen units but at an increased cost of four units. If additionally the time for Activity 1 is decreased by six units, bringing the total time to ten units, the total cost will be increased by sixteen units. It will be noted that the graph indicates, taking into account cost increases per unit time decreases, the possibilities of decreasing the time, without complete crash procedures, so as to limit cost increases, thus taking into account the fact that an overall monetary advantage may not be gained by taking full advantage of crash times, as under conditions where there is no point in decreasing the time for a job beyond a point where that job ceases to be critical.

For the particular activities given, it will be evident that maximum advantage should be first taken of reduction of time for that activity for which unit time reduction involves the least increase of cost, and this condition is indicated by the full line graph in FIGURE 5. It will be evident that adopting this is superior to the sequence illustrated in dotted lines which would involve favoring decrease of time of Activity 1 for which the cost increase per unit decrease in time is greater.

Figure 6:
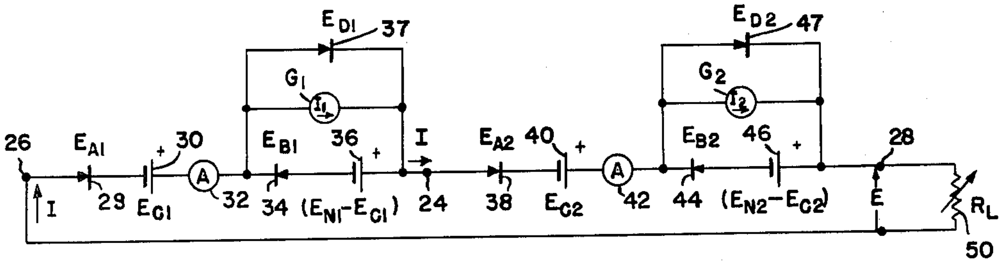
FIGURE 6 is a wiring diagram showing theoretical elements of an analog involving matters of cost.

Consideration may now be given to FIGURE 6 which shows a portion of an analog corresponding to the successive Activities 1 and 2 in an idealized form.

The analog, however, does not follow, in its operation, the graph illustrated in FIGURE 5, but, rather, involves basically operation in accordance with the derivative of that graph with respect to the time abscissae. As will be explained, the graph may be drawn, automatically or plotted, as an integral with respect to activity time. For clarity, the derivative is indicated in dash lines in FIGURES 3, 4 and 5, the auxiliary scale showing the values of the derivatives.

In FIGURE 6 the portion of the circuit to the left of terminal 24 corresponds to Activity 1 and that to the right to Activity 2. Starting with the initial terminal 26, the circuit comprises in series a diode 28 arranged for forward current flow to the right, a voltage source (battery) 30, and an ammeter 32. To the right of the last there are three parallel branches. The lowermost contains, in series, the diode 34 arranged for forward current toward the left and the source (battery) 36. The second branch contains a constant current generator $G_1$. The third branch contains the diode 37 arranged for forward current flow to the right. The second portion of the circuit shown in FIGURE 6 comprises similar elements which, in the same sequence as just described, are designated, respectively, 38, 40, 42, 44, 46, $G_2$ and 47. This second portion of the circuit runs to terminal 28, and the extreme terminals 26 and 28 are illustrated as connected by the adjustable resistor 50 (representative of an adjustable resistance of a more complex circuit in which they might be incorporated or, as will appear later, of a bucking power supply). The resistor 50 may be considered a current control, adjustable for the variation of cost conditions. It may be remarked that two ammeters 32 and 42 are indicated merely for completeness though in the particular circuit illustrated they carry the same current. In more elaborate setups individual ammeters for each circuit element might be desirable. Potentials measurable across the diodes are indicated at $E_{A1}$, $E_{B1}$, $E_{D1}$, $E_{A2}$, $E_{B2}$, and $E_{D2}$. As in the case of the elementary analog shown in FIGURE 2 potentials represent time. Battery 30 has a voltage $E_{C1}$ corresponding to the crash time of Activity 1 (e.g. six volts). Battery 3 has a voltage equal to $E_{N1}-E_{C1}$ corresponding to the difference between the normal time for Activity 1 and its crash time (i.e. six volts). The voltage of battery 40 is $E_{C2}$ (four volts) corresponding to the crash time of Activity 2, and the voltage of battery 46 is $E_{N2}-E_{C2}$ (four volts) corresponding to the difference between the normal and crash times of Activity 2.

The constant current generator $G_1$ provides a constant current $I_1$ flowing to the right and having a value of two amperes corresponding to the cost increase per unit decrease of time of Activity 1. Similarly, the constant current generator $G_2$ provides a current $I_2$ to the right of one ampere corresponding to the cost increase per unit decrease of time of Activity 2. (The units are given in term of volts and amperes merely for reference; obviously any arbitrary units could be used, and currents would normally be of the order of milliamperes rather than amperes.)

For the purpose of the present explanation, the generators $G_1$ and $G_2$ are idealized: as will be later pointed out, equivalents are actually provided. For the present explanation, the generators may be considered as delivering constant current against the reverse potentials which may exist.

Operation of the circuit may be considered as follows:

As will later appear, the circuit might well form a branch of a network which is non-critical and such that there may be imposed across terminals 26 and 28 a potential in excess of potentials in the circuit itself so that no current I would flow due to blocking of reverse current by diodes 28 and 38. In that event, as has already been made clear from consideration of FIGURE 2, the sum of the potentials $E_{A1}$ and $E_{A2}$ would be a measure of the float or slack time of the combination of the two activities. We may now pass to consideration of the situation in which the activities are critical.

Assume first that the current I is zero due to conditions across the terminals 26 and 28 arising from other branches of a network controlling the current flow but idealized in FIGURE 6 as merely the adjustable resistance 50, $R_L$ for the zero current condition being effectively infinite. Under these conditions the current from generator $G_1$ circulates through the battery 36 and diode 34 and that from generator $G_2$ circulates through the battery 46 and diode 44. Then the potential E across the terminals 26 and 28 is the sum of the voltages of the batteries 30, 36, 40 and 46, namely $E_{N1}+E_{N2}$. This corresponds to the sum of the normal times for the two activities: twenty volts.

At this time the reverse potential $E_{D1}$ across diode 37 is the voltage of battery 36; and similary that, $E_{D2}$ across diode 47 is the voltage of battery 46. The current I is now zero, indicating no additional cost involved.

Consider next a value of current I less than $I_2$ (which is assumed less than $I_1$) resulting from adjustment of circuitry external to terminals 26 and 28 and which may, typically, result from adjustment of a resistance such as $R_L$ (though so far as the circuit under description is concerned, it is not material what the cause of the particular current may be). Then potential conditions remain as before, but the current flowing towards the left through the source 46 and diode 44 is decreased to become $I_2-I$ and that through the source 36 and diode 34 is decreased to become $I_1-I$. Both sources 36 and 46 thus remain in the circuit contributing their potentials to provide, as before, the same output potential $E_{N1}+E_{N2}$, and also maintaining diodes 37 and 47 cut off. If diode 44 was considered to have zero forward resistance, the reverse potential $E_{D2}$ across diode 47 would remain that of source 46; but while from the standpoint of overall operation the forward resistance of diode 44 is low and effectively zero, it will have an actual resistance providing a potential drop, this resistance becoming relatively high as I approaches $I_2$, and therefore as I increases towards $I_2$ the potential $E_{D2}$ will progressively drop so that measurement of the potential $E_{D2}$ will serve as an indication, as it approaches zero of the impending change of configuration involved when $I=I_2$, the indication signalling the desirability of taking readings.

When $I=I_2$ there occurs an abrupt change in operation, the sharpness of this being deteriorated only to the extent that the diodes are imperfect. The change is due to the fact that when the current through diode 44 becomes zero (or, strictly speaking, slightly reversed) the branch containing it is opened so that source 46 is switched out of the circuit. Accordingly, the potential E of terminal 28 relative to terminal 26 abruptly changes to $E_{C1}+(E_{N1}-E_{C1})+E_{C2}=E_{N1}+E_{C2}$ to correspond to the normal time of Activity 1 plus the crash time of Activity 2: in the example given, sixteen volts.

As I further increases above $I_2$ but less than $I_1$, the extra current $I-I_2$ flows forwardly through diode 47, $E_{D2}$ becoming substantially zero, i.e. only the low voltage drop involved in forward conduction.

Changes in the left hand portion of the circuit continue as before, less current flowing through source 36 and diode 34, but the source 36 still remaining in the circuit. $E_{D1}$ changes as previously described with reference to $E_{D2}$.

When $I=I_1$ another abrupt change occurs, involving the effective switching of source 36 out of the circuit as diode 34 is cut off at the condition of zero current flow therethrough. The result is that the potential E of terminal 28 relative to terminal 26 then changes to $E_{C1}+E_{C2}$ to correspond to the sum of the crash times of Activities 1 and 2: i.e. ten volts.

It will now be evident that if E was plotted (manually or automatically) against I during the carrying out of the foregoing changes of I, there would be obtained the stepped (dash) curve of FIGURE 5 in which E and I are indicated in parentheses. As already indicated, the full line curve in that figure is the integral of the stepped curve so that the full line curve of interest may be directly derived. Thus there can be obtained the desired information of increase of cost attending the shortening of times involved in the combined Activities 1 and 2.

It may be noted that the circuit arrangement illustrated in FIGURE 6 automatically takes into account the fact that if time is to be decreased that end should be accomplished by crash programming of the activities in the sequence in which a progressive decrease of time is attended with the minimum cost increase; i.e. the operation results in giving the full line curve rather than the dotted line curve in FIGURE 5.

While FIGURE 6 has been described as involving two separate activities in series, it will be clear that it might well represent a single activity for which the increase of cost versus decrease of time function is nonlinear. Thus any nonlinear relationship of this type for a single activity may be sufficiently approximated by representing that activity by a series of circuit components of the type discussed. The extension to parallel arrays will be obvious.

To summarize what has been so far described, it will now be seen that an analog may be made up of elements of the type shown in FIGURE 6 (where decrease of time at additional cost is involved) combined with the simpler elements of FIGURE 2 to represent activities which may not be shortened by sustaining increased costs. (Considering the left-hand element, this is reduced to the simpler element of FIGURE 2 by making the potential of battery 36 zero and the current $I_1$ zero.) That the two types of elements may be freely combined is obvious.

As has been mentioned, conventional batteries are not well-adapted to be used in the network elements of FIGURE 6 because of their discrete voltages, and number required, and the current drains thereon which would require time-consuming replacement. But the elements of that figure become practical if voltage sources other than batteries are used. For example, solar cells may be used with the voltages adjustable by control of illumination thereof. Other similar self-generating light responsive devices may be used. Or, instead of the batteries thermionic diodes may be used taking advantage of the Edison effect, the control of voltage being then achieved by variation of heater current. The devices of the types just described, may, of course, be used in series to achieve sufficient voltage ranges. Another alternative which may be used is a conventional type of A.C. to D.C. power supply involving conventional input transformers, rectifiers and filters. In the case of the constant current generator, a source of any of the types described may be combined with a series pentode to secure constant current flow in conventional fashion. It is to be noted that the voltage and current supplies thus provided, if the nonlinear circuit elements were of the type shown in FIGURE 6, would have to be generally independent of each other with input controls which would not interfere with the operation of the circuit. These problems may be solved by using, as indicated, light intensity, temperature of a cathode, or transformers from the commercial alternating supply. But there is also possible some simplification by proper arrangement of the sources so that some may be common to a plurality of elements. This last aspect will not be detailed here since there will now be described a preferred form of circuit element and a complete apparatus in which it is used.

FIGURE 7 shows a preferred circuit element or module which is relatively simple in both construction and operation and lends itself to simpler association with others in a network. As will appear, any desired number of these modules may be incorporated in the apparatus and interconnected with each other and with other devices in the apparatus.

Input and output terminals are provided at 52 and 54. Power supply terminals are provided at 56 and 58, which terminals, for each module, are fed alternating current from an individual secondary 60 of one or more transformers 62 having a primary winding or windings 64 fed from the commercial alternating supply terminals 66. While a single transformer may be provided having multiple secondary windings as indicated at 60′ and 60″, the large number of modules used may, from the practical standpoint, involve a number of these transformers. In any event, each module receives its individual alternating supply from, and is isolated from the other modules in the system by, the separate secondaries. So far as functional operation is concerned, the apparatus about to be described operates with direct current, and accordingly the terminals 56 and 58 feed a rectifier 68 to provide direct current on the lines 70 and 72. Adequate filtering is provided by a capacitor 74. A typical direct voltage which is provided is 100 volts. A resistor 76 connects line 70 to a line 78 connected to the anode of a diode 80, the cathode of which is connected at 82 to output terminal 54.

A voltage divider is provided between the lines 70 and 72 by the arrangement of resistor 84 and Zener diode 86 in series. It may be assumed that the junction point 88 between these elements is at −55 volts with respect to line 72. A series arrangement of resistor 90 and capacitor 92 desirably connects the input terminal 52 to the ground of the apparatus.

The input terminal 52 is connected to the emitter of a PNP transistor 94, the base of which is connected through diode 96 to the emitter. The base of this transistor is also connected at 98 to the adjustable contact 100 of potentiometer 102 which is connected between junction 88 and line 72. A capacitor 104 connects the adjustable contact with the same line.

The collector of transistor 94 is connected at 106 to the base of an NPN transistor 108, the emitter of which is connected through resistor 110 to line 70. A neon or similar indicating lamp 112 is connected between the collector of transistor 108 and the line 72 through resistor 114. The collector of transistor 108 is also connected through resistor 116 to terminal 88.

An NPN transistor 118 has its emitter connected at 120 to line 78, and its collector connected at 122 to line 72. Its base is connected at 124 to the adjustable contact 126 of potentiometer 128 which, in series with resistor 130 is connected between junction 88 and line 72. A capacitor 132 connects the contact 126 with line 72. A voltage divider is provided between junction 88 and line 72 by resistors 134 and 136, the latter having a resistance value which is low in comparison with that of the former. The junction which has a potential of about −1.2 volts with respect to line 72 is connected at 138 to the base of PNP transistor 140. The emitter of this transistor is connected to the adjustable contact 142 of a potentiometer 144 functioning as a variable resistance in series with resistor 146 in connection to the line 72. The collector of transistor 140 is connected at 148 to output terminal 54. Incorporated in each module is a double pole-double throw switch 150, to the movable contacts of which the input and output terminals are connected. Selection is provided by this switch between the pair of terminals 152 and 154 or the pair of terminals 156 and 158. This switch is desirably of the push-button type with the closed contacts normally made at 152 and 154.

While the operation of the module will be described in detail hereafter, it may be here remarked that the described circuitry provides, essentially, a pair of regulated voltages. One of these is between input terminal 52 and the base of transistor 140. The value of this is set by adjustment of potentiometer contact 100. This is the normal time adjustment.

The second regulated voltage is that between the base of transistor 140 and the line 78. The adjustment of this is by the movable contact 126. This is the crash time adjustment. The adjustment of contact 142 is for the penalty rate.

Reference may be next made to FIGURE 8A, in which there are indicated, for illustration, two modules 51 of the type shown in FIGURE 7, representative of what may be a large number of these. As will be evident any desired number of these may be incorporated in the apparatus, and what is illustrated particularly in FIGURE 8A is the arrangement for interconnecting these into an arbitrary network corresponding to the problem to be solved.

The major element of this is the plug board 160. This is provided with sockets 162 which, by insertion of plugs will provide connections from the output of any module to the input of another as well as other connections to various parts of the circuitry. Since, in setting of the apparatus, a systematic sequence of the modules may be used in a network, it is necessary to provide only half or less of what might be considered a complete array, and it is convenient, therefore, to arrange the sockets through a triangular half of a rectangle as indicated. Furthermore, the upper right of a complete array may also be eliminated since in a practical system, of say thirty modules, no more than fifteen may be provided for connection to the start of the project and no more than fifteen to the end. The arrangement, however, is quite arbitrary.

Each socket is indicated as having inner and outer terminals. The plugs to be inserted in these sockets contain diodes and electrically are as diagramed at 164, each plug being so arranged that, when inserted in a socket, its anode is connected to the outer terminal of the socket and its cathode to the inner terminal. The use of these diodes is, generally, to prevent the application of excessive reverse potentials to the modules and prevention of accidental connections leading to circulatory currents. So far as normal operation is concerned, they may be regarded as direct connecting elements, the forward resistances of the diodes being negligible in comparison with other resistances in the modules. However, the diodes also provide logical isolation in some instances as where a direction of flow or sequence is required, which may be established by a "dummy job" having itself zero duration or completion time.

The inner terminals of the sockets 162 of the respective columns are connected together as indicated at 166 and to the input terminals 152 of individually corresponding modules. In similar fashion the outer terminals of the sockets of the individual rows are connected together as indicated at 168 and to the output terminals 154 of the respective modules.

A special row of sockets 170 have their inner terminals connected respectively to the terminals 156 of the modules through leads 172. The outer terminals of these sockets are connected together and to a line 174. This arrangement provides for set-up purposes.

There is also an auxiliary column of sockets 176 the outer terminals of which are connected respectively through leads 178 to the terminals 158 of the modules. The inner terminals of these sockets 176 are connected together and to a line 180, the arrangement also serving for set-up purposes. The line 180 is provided with the protective diode 182.

A line 184 is connected to the outer terminals of the first row of sockets 162. In similar fashion the line 186 is connected to the inner terminals of the last column of sockets 162.

A pair of probes 188 are connected to lines 190. These probes are arranged to be inserted in the diode plugs previously mentioned to connect these diodes externally for set-up and reading purposes.

Reference may now be made to FIGURE 8B at the top of which the various described leads are shown as continuations of the lower portion of FIGURE 8A.

An integrator is illustrated at 192. This is of a conventional type including the direct current amplifier 194 having an input terminal 196 and an output terminal 198, which terminals are connected through a capacitor 200. The common terminal of the amplifier is indicated at 202.

The input terminal 196 is connected through a switch 204 to the line 206, between which and the common terminal 202 are arranged the oppositely polarized diodes 210 the purpose of which is to protect the integrator from excess voltages, the diodes providing sufficiently high resistance at the quite low voltages which are to operate the integrator. The integrator is provided with the usual resetting arrangement, not shown.

A connection 212 including the resistor 214 connects line 206 to a line 216 connected through diode 220 to a terminal of a ramp voltage power supply 218. The other terminal of this power supply is connected to line 186, and line 216 and line 186 are connected through a resistor 224.

The ramp voltage power supply 218 is designed to provide a potential bucking the outputs from the modules. It comprises a motor-operated linear potentiometer arrangement so that, from a maximum value, it provides a decreasing output voltage which is linear with time. However, provision is made for stopping the variation of its output voltage at any time so that there may be made an examination of conditions in the network. The operation of this will become more apparent hereafter. The voltage drop through resistor 224 provides the back voltage on the network system and, being variable because of the operation of the ramp voltage generator controls current flow.

A conventional plotter of ordinates against abscissae to provide a curve for examination is provided at 226. The abscissa input terminals are connected to the movable contacts of a double pole-double throw switch 228. The right-hand fixed contacts of this switch, as illustrated, are connected respectively to the lines 186 and 216 so that the abscissa input may respond to the potential across the resistor 224.

The left-hand fixed contacts are connected respectively to the lines 230 and 232 across which there may be provided an input for setup and adjusting purposes.

The ordinate input of the plotter is connected to the lines 236 which run to the movable contacts of a two-bank multiple position switch 238.

A voltmeter 234, of digital or other type, has its leads 240 connected to the movable contacts of a two-bank multiple position switch 242. In anticipation of what is about to be described, it may be noted that the connections are such that inputs may be selectively applied either to the ordinate input of the plotter or to the input of the voltmeter, the former being used to provide a graph, while the latter may be used to make instantaneous readings. The switches 238 and 242 provide for the selection of inputs to these elements.

Considering the fixed contact of the switches 238 and 242, the contacts 244 and 246 are connected together and to the line 206 previously mentioned.

The contacts 248 and 250 are similarly connected together and through line 252 to the line 216.

A double pole-double throw switch 254 has its movable contacts connected to lines 190. To the illustrated upper fixed contacts the contacts 256 and 258 are connected through lines 260. In similar fashion the contacts 262 and 264 of switch 242 are connected through lines 266 to the lower fixed contacts of switch 254.

Contacts 268 and 270 are connected together and through line 272 to the output 198 of the amplifier.

Contacts 274 and 276 are connected together and through connection 278 to the common terminal 202 of the amplifier.

Contact 280 is connected to the line 282 and contact 284 is connected to the line 286. Contact 288 is connected to line 290, and contact 292 is connected to line 294. These last lines 282, 286, 290 and 294 run to the setup and adjusting system.

The adjusting system appears in the lower portion of FIGURE 8B. This includes a conventional direct current power supply 296 which provides its output to a potentiometer 298, the adjustable contact of which is connected through diode 300 to the line 232 previously described, the lower terminal of potentiometer 298 being connected to the previously described line 230. This arrangement is such as to provide an alternative input for the abscissa terminals of the plotter 226. Two other output connections 302 and 304 provide adjustable potentials from the power supply 296. The output at 304 is provided through resistor 306 and lead 308 to a fixed contact 328 of a double bank multiple selection switch 310. The movable contacts of this switch are connected respectively to the lines 286 and 294. A double pole-double throw switch is provided at 312, its movable contacts being connected respectively to the lines 174 and 180. The upper right-hand fixed contact 314 of this switch is connected to line 282, while the lower right-hand contact 318 is connected through line 324 to the line 232. The upper right fixed contact 314 is connected through resistor 316 to the lower left fixed contact 322 and also through connection 325 and connection 334 to the line 290. The upper left fixed contact 320 is connected to the line 294.

Contact 330 is connected to line 325 and to the next adjacent contact 336. Contact 332 is connected to line 290 through the connection 334.

Contact 338 is connected through resistor 340 to the power supply connection 302. This same connection is connected to fixed contact 342.

For an understanding of the operation reference may first be made to FIGURE 7. The module illustrated in FIGURE 7 will be located in a network under conditions which will start with a voltage sufficiently high to prevent current flow therethrough, so that an explanation may be started considering a zero output current of the module.

Since under these conditions the transistor 108 receives no ace current, it is cut off and, accordingly, the neon lamp 112 is not illuminated. Certain other aspects of the circuit may be referred to because they exist not only at this time but later.

The potentiometer contact 100 sets a potential $-v_A$ which is applied to the base of transistor 94. This action is to set between terminal 52 and connection 138 a potential $V_A$ which corresponds to normal time for the module.

The setting of potentiometer contact 126 provides thereat a potential $-v_B$ which is applied to the base of transistor 118. It will be noted, following the connection of the emitter of this transistor through 120 to resistor 76, that an emitter follower arrangement is provided which sets the potential between terminal 52 and the connection 78 to the left of diode 80. This last potential corresponds to crash time and its setting will always be less than $V_A$ as indicated in the figure.

Consider, now, the conditions arising when the externally applied potential falls below the available potential at the terminals of the module so that the small current flows. The current path is from terminal 52 through the emitter and collector of transistor 94, thence through the base and emitter of transistor 108, through resistor 110, the power supply, and then through resistor 146 and the adjustable resistors provided at 142, and from the emitter to collector of transistor 140, and then to terminal 54. Conduction of transistor 108 causes the neon lamp 112 to glow, signalling that the module is in a critical path. The potential at the cathode of diode 80 is more positive than that at its anode, and accordingly it does not conduct, so that there is no contribution of current through it to terminal 54. Transistor 140 is now conductive, and for practical purposes, its base, emitter and collector may all be considered connected together. This means that connection 138 is effectively directly to terminal 54 so that the potential $V_A$ appears between the input and output terminals. Normal time for the module is thus indicated, remembering, as before, that potentials represent time.

The last condition continues as current increases, the potential between the input and output terminal remaining substantially constant, with diode 80 continued cut-off.

As the current continues to increase, a potential drop occurs through the fixed resistor 146 and the adjustable resistance at 144, causing the transistor 140 to change in a negative direction. The condition is ultimately reached at which the potential of its emitter and of its collector drops to a point such that the potential at the cathode of diode 80 becomes negative with respect to that of its anode. This transition occurs fairly abruptly, and provides a sharp transition in the condition of operation. The particular current at which this occurs is determined by the resistance value between line 72 and the emitter of transistor 140 and this determines the penalty rate, the setting of contact 142 being preliminarily made for this quantity for the job represented by the module. When this condition occurs, the potential of terminal 54 with respect to terminal 52 becomes $V_B$. The transition, therefore, results in a potential corresponding to crash time. Further increase of current provides increasing flow through diode 80, the current through transistor 140 to terminal 54 reaching and thereafter maintaining a plateau.

While the transitions are not completely sharp, the result is a voltage-current characteristic such as that indicated in the dash lines in FIGURE 3, and for practical purposes a step condition of this sort essentially results.

It will be evident, therefore, that from the standpoint of characteristics of operation, the module has essentially the properties previously discussed with respect to the elements shown in FIGURE 6.

The operation of the circuitry shown in FIGURES 8A and 8B may be simplified by reference to FIGURE 9 which shows a modular array of the type previously discussed and provided by the plug board connections together with the ramp voltage supply 218, the integrator 192, the voltmeter 234, and the selecting switch 242 and its various connections. As will be evident from FIGURE 8B, the plotter is connected in the same fashion as the voltmeter, selection being effected by its switch 238 which corresponds to switch 242. The description of the voltmeter connections will therefore suffice for the ordinate input of the plotter 226 as well, the plotter merely providing a curve of the same readings as those taken by the voltmeter against time.

When the switch 242 is in its right-hand position so that its movable contacts engage terminals 246 and 250, it will be noted that connections are made across the resistor 214 which carries the current passing through the modular array. The current is measured in terms of the voltage drop and represents the penalty rate in terms of dollars per unit time.

When the contacts 262 and 264 are engaged, the voltmeter is connected to the probes 188, which may be plugged into any of the diode plugs to determine the potential drop across any individual module 51. The measurement then is of time.

When connection is made to contacts 262 and 276, the voltmeter is connected between the input and output of the integrator 192, to measure dollars. Scaling of the voltmeter readings is, of course, determined for the particular problem involved.

Note may be made of the operation of the integrator. When the ramp voltage supply 218 is operating automatically by its motor, it will sweep through its range in a matter of a few seconds, and does so with a linear change of its output voltage with respect to time. The integration is with respect to this time, but since time is proportional to voltage in the case of the ramp voltage supply and is also proportional to time involved in the project being analyzed, the integrator output gives a proper dollar value in accordance with considerations heretofore discussed. This integration, of course, transforms the step function of FIGURE 5, for example, into the full line function therein. While this action is of interest in connection with the voltmeter, it is most useful when the output from the integrator is provided to the plotter.

The setup operation requires no special discussion, since it will be evident that the various switches may be used to connect individual modules or combinations thereof to either the voltmeter or the plotter, by which, in particular, initial settings of the normal and crash voltages and of the penalty rate may be set. The circuitry is obviously such that both settings and operational readings may be made in very many fashions to secure all pertinent information.

While two modifications of the invention have been described, taking into account the aspects of reducing project time at the expense of greater cost, as well as a simple modification merely used for determining critical paths, many modifications of the apparatus will be apparent to those skilled in the art. For example, while direct current operation has been particularly described, it will be evident that alternating current operation may be equally used, particularly utilizing peak voltage measurements. The apparatus is also more generally usable in connection with flow problems.

It will be evident that there may be provided remote indicators for measurable quantities in the computer and also external devices responsive to such quantities for auxiliary control purposes.

It will be clear that numerous variations in details of construction and operation may be made without departing from the invention as defined in the following claims.

What is claimed is:

1. An analog comprising a plurality of terminals, and circuit elements interconnecting said terminals, each of said circuit elements including, in series association between the terminals which it connects, at least a voltage source and a substantially unidirectionally conductive element disposed to conduct in the direction of current caused to flow through it by its associated voltage source, at least three of said terminals being connected by two of said elements arranged for flow of current in series from one through the other.

2. An analog according to claim 1 in which said unidirectionally conductive elements are diodes.

3. An analog according to claim 1 in which at least one of said circuit elements includes additional means producing a step function relationship between the potential thereacross and the current therethrough.

4. An analog according to claim 3 in which the means producing a step function comprises a biased transistor.

5. An analog comprising a plurality of terminals, and circuit elements interconnecting said terminals, each of said circuit elements including, in series association between the terminals which it connects, at least a voltage source, a substantially unidirectionally conductive element disposed to conduct in the direction of current caused to flow through it by its associated voltage source, at least three of said terminals being connected by two of said elements arranged for flow of current in series from one through the other, and means indicating conductivity of said elements.

6. An analog comprising a plurality of terminals, and circuit elements interconnecting said terminals, each of said circuit elements including, in series association between the terminals which it connects, at least a voltage source and a substantially unidirectionally conductive element disposed to conduct in the direction of current caused to flow through it by its associated voltage source, at least three of said terminals being connected by two of said elements arranged for flow of current in series from one through the other, and means providing a variable potential bucking the outputs of said elements.

7. An analog comprising a plurality of terminals, and circuit elements interconnecting said terminals, each of said circuit elements including, in series association between the terminals which it connects, at least a voltage source and a substantially unidirectionally conductive element disposed to conduct in the direction of current caused to flow through it by its associated voltage source, at least three of said terminals being connected by two of said elements arranged for flow of current in series from one through the other, and means providing a potential varying substantially linearly with time bucking the outputs of said elements.

8. An analog comprising a plurality of terminals, and circuit elements interconnecting said terminals, each of said circuit elements including, in series association between the terminals which it connects, at least a voltage source and a substantially unidirectionally conductive element disposed to conduct in the direction of current caused to flow through it by its associated voltage source, at least three of said terminals being connected by two of said elements arranged for flow of current in series from one through the other, at least one of said circuit elements including additional means producing a step function relationship between the potential thereacross and the current therethrough, and means providing a variable potential bucking the outputs of said elements.

9. An analog comprising a plurality of terminals, and circuit elements interconnecting said terminals, each of said circuit elements including, in series association between the terminals which it connects, at least a voltage source and a substantially unidirectionally conductive element disposed to conduct in the direction of current caused to flow through it by its associated voltage source, at least three of said terminals being connected by two of said elements arranged for flow of current in series from one through the other, at least one of said circuit elements including additional means producing a step function relationship between the potential thereacross and the current therethrough, and means providing a potential varying substantially linearly with time bucking the outputs of said elements.

10. An analog comprising a plurality of terminals, and circuit elements interconnecting said terminals, each of said circuit elements including, in association, at least a voltage source and a substantially unidirectionally conductive elements disposed to conduct in the direction of current caused to flow by its associated voltage source, at least three of said terminals being connected by two of said elements arranged for flow of current in series from one through the other, at least one of said circuit elements including additional means producing a step function relationship between the potential thereacross and the current therethrough, and an integrator receiving current from said elements.

11. An analog comprising a plurality of terminals, and circuit elements interconnecting said terminals, each of said circuit elements including, in association, at least a voltage source and a substantially unidirectionally conductive element disposed to conduct in the direction of current caused to flow by its associated voltage source, at least three of said terminals being connected by two of said elements arranged for flow of current in series from one through the other, at least one of said circuit elements including additional means producing a step function relationship between the potential thereacross and the current therethrough, an integrator receiving current from said elements, and means providing a variable potential bucking the outputs of said elements.

12. An analog comprising a plurality of terminals, and circuit elements interconnecting said terminals, each of said circuit elements including, in association, at least a voltage source and a substantially unidirectionally conductive element disposed to conduct in the direction of current caused to flow by its associated voltage source, at least three of said terminals being connected by two of said elements arranged for flow of current in series from one through the other, at least one of said circuit elements including additional means producing a step function relationship between the potential thereacross and the current therethrough an integrator receiving current from said elements, and means providing a potential varying substantially linearly with time bucking the outputs of said elements.

13. An analog comprising a plurality of terminals, and circuit elements interconnecting said terminals, each of said circuit elements including, in series association between the terminals which it connects, at least a voltage source and a substantially unidirectionally conductive element disposed to conduct in the direction of current caused to flow through it by its associated voltage source, at least three of said terminals being connected by two of said elements arranged for flow of current in series from one through the other, said terminals being provided by two-terminal connectors having their terminals connected to said circuit elements, and diode members for connecting for unidirectional current flow the terminals of said connectors.

14. An analog comprising a plurality of terminals, and circuit elements interconnecting said terminals, each of said circuit elements including, in series association between the terminals which it connects, at least a voltage source and a substantially unidirectionally conductive element disposed to conduct in the direction of current caused to flow by its associated voltage source, at least three of said terminals being connected by two of said elements arranged for flow of current in series from one through the other, said terminals being provided by two-terminal connectors having their terminals connected to said circuit elements, and members for connecting the terminals of said connectors.

15. An analog comprising a plurality of terminals, and circuit elements interconnecting such terminals, each of said circuit elements including, in series association between the terminals which it connects, an electrical source having a predetermined but adjustable relationship between voltage and current, and a substantially unidirectionally conductive element disposed to conduct in the direction of current caused to flow through it by its associated electrical source, at least three of said terminals being connected by two of said elements arranged for flow of current in series from one through the other, and means to measure the current-voltage relationship between any pair of the plurality of terminals.

16. An analog according to claim 15 including means associated with each of said circuit elements to indicate when a particular current or voltage condition is met or exceeded.

References Cited by the Examiner

UNITED STATES PATENTS

| | | | |
|---|---|---|---|
| 2,831,107 | 4/1958 | Raymond et al. | 235—197 |
| 2,934,273 | 4/1960 | Elmore et al. | 235—185 |
| 3,017,104 | 1/1962 | McCarty et al. | 235—185 |
| 3,053,453 | 9/1962 | Bock et al. | 235—185 |

OTHER REFERENCES

Pages 501–502, 1961, Fifer, S., Analogue Computation, N.Y., McGraw-Hill, Q A, 76.4, F5.

MALCOLM A. MORRISON, *Primary Examiner.*